United States Patent
Koshiyama

(10) Patent No.: US 11,274,717 B2
(45) Date of Patent: Mar. 15, 2022

(54) BRAKE ROTOR ASSEMBLY

(75) Inventor: Kazuki Koshiyama, Sakai (JP)

(73) Assignee: Shimano Inc., Osaka (JP)

( * ) Notice: Subject to any disclaimer, the term of this patent is extended or adjusted under 35 U.S.C. 154(b) by 299 days.

(21) Appl. No.: 12/829,516

(22) Filed: Jul. 2, 2010

(65) Prior Publication Data
US 2012/0000736 A1 Jan. 5, 2012

(51) Int. Cl.
*F16D 55/02* (2006.01)
*F16D 65/847* (2006.01)

(52) U.S. Cl.
CPC .................. *F16D 65/847* (2013.01)

(58) Field of Classification Search
CPC ..... F16D 2055/0004; F16D 2055/0075; F16D 65/00; F16D 65/005; F16D 65/02; F16D 65/12; F16D 65/123; F16D 65/128; F16D 2065/13; F16D 2065/1304; F16D 2065/134; F16D 2065/1392; F16D 65/78; F16D 65/84; F16D 2300/12; F16D 65/847
USPC ........... 188/264 R, 264 A, 264 AA, 218 XL, 188/24.11
See application file for complete search history.

(56) References Cited

U.S. PATENT DOCUMENTS

| | | | |
|---|---|---|---|
| 4,636,675 A * | 1/1987 | Takahashi ...................... | 310/157 |
| 6,079,611 A | 6/2000 | Nakamura et al. | |
| 6,164,421 A * | 12/2000 | Nakamura et al. .......... | 188/71.5 |
| 6,290,032 B1 * | 9/2001 | Patrick ...................... | C23C 4/08 |
| | | | 188/218 XL |
| 6,349,800 B1 * | 2/2002 | Nakamura ...................... | 188/26 |
| 7,331,433 B2 * | 2/2008 | Okabe ..................... | B62L 1/005 |
| | | | 188/218 XL |
| 7,416,060 B2 | 8/2008 | Takizawa | |
| 7,424,938 B2 | 9/2008 | Takizawa | |
| 2001/0030094 A1 * | 10/2001 | Pareti ........................ | 188/250 R |
| 2005/0006186 A1 | 1/2005 | Iwai et al. | |
| 2005/0145452 A1 * | 7/2005 | Yamamoto ............. | 188/218 XL |
| 2006/0037819 A1 | 2/2006 | Takizawa | |
| 2010/0133054 A1 * | 6/2010 | Wagner ................... | F16D 65/12 |
| | | | 188/218 XL |
| 2010/0148639 A1 * | 6/2010 | Lee ............................. | 310/68 D |
| 2010/0258394 A1 * | 10/2010 | Hanna et al. ............. | 188/264 A |
| 2011/0240420 A1 * | 10/2011 | Souwa et al. .......... | 188/218 XL |

FOREIGN PATENT DOCUMENTS

| | | |
|---|---|---|
| DE | 296 10 469 U1 | 10/1997 |
| DE | 199 63 031 C1 | 5/2001 |
| DE | 10 2011 001 504 A1 | 10/2011 |
| EP | 0128758 A1 * 12/1984 | ........... F16D 65/853 |
| EP | 1 847 452 B1 | 1/2010 |
| JP | 200390368 A * | 3/2003 |

(Continued)

OTHER PUBLICATIONS https://www.counterman.com/copper-disappearing-brake-pads/ (Year: 2016).*

(Continued)

*Primary Examiner* — Melody M Burch
(74) *Attorney, Agent, or Firm* — Global IP Counselors, LLP

(57) ABSTRACT

A brake rotor assembly includes a rotor member and a cooling member. The rotor member has a first exterior surface and a second exterior surface. The cooling member is coupled to at least one of the first and second exterior surfaces of the rotor member.

17 Claims, 9 Drawing Sheets

(56) References Cited

FOREIGN PATENT DOCUMENTS

| JP | 2003-278810 A | 10/2003 | |
|---|---|---|---|
| WO | 2004/094858 A1 | 11/2004 | |
| WO | WO-2007016806 A1 * | 2/2007 | ............. F16D 65/12 |

OTHER PUBLICATIONS https://www.engineersedge.com/heat_transfer/convection.htm (Year: 2021).*
https://www.engr.colostate.edu/~allan/heat_trans/page4/page4.html (Year: 2021).*
Ford Mustang, 1987-1993; GT Baer EradiSpeed-Plus Front 11" Rotors—4 Lug; Part #: 2261004.
Mitsubishi Lancer Evolution X Part 2, 2009; making Great Brakes Even Better; Mike Kojima.

* cited by examiner

BRAKE ROTOR ASSEMBLY

BACKGROUND

1. Field of the Invention

This invention generally relates to a disk brake rotor. More specifically, the present invention relates to disk brake rotor with cooling member that has exposed surfaces providing disk brake rotor cooling.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY

One aspect is to provide a brake rotor assembly with a cooling member that dissipates heat generated during braking.

In view of the state of the known technology, a brake rotor assembly in accordance with the present invention includes a rotor member and a cooling member. The rotor member has a first exterior surface and a second exterior surface. The cooling member is coupled to at least one of the first and second exterior surfaces of the rotor member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
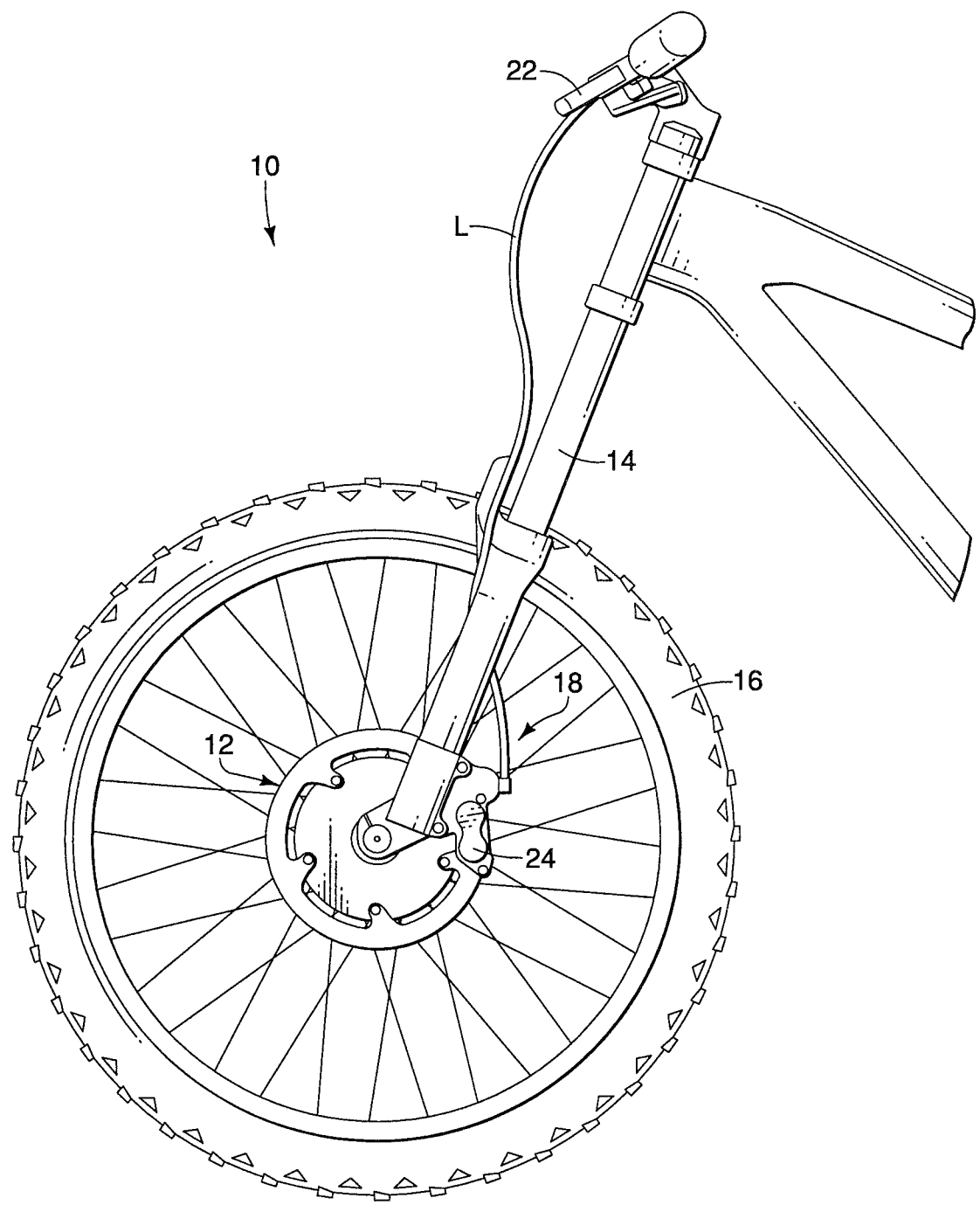
FIG. 1 is a side elevational view of a bicycle that is equipped with a brake rotor assembly in accordance with a first embodiment.

Referring initially to FIG. 1, a bicycle 10 is illustrated with a brake rotor assembly 12 in accordance with a first embodiment.

The bicycle 10 includes a frame 14, a front wheel 16 and a brake system 18. The front wheel 16 is rotatably mounted on a portion of the frame 14 in a conventional manner. The brake system 18 is designed to provide a braking capability to slow and/or stop rotation of the front wheel 16 in response to operation of the brake system 18 by a cyclist (not shown).

Figure 2:
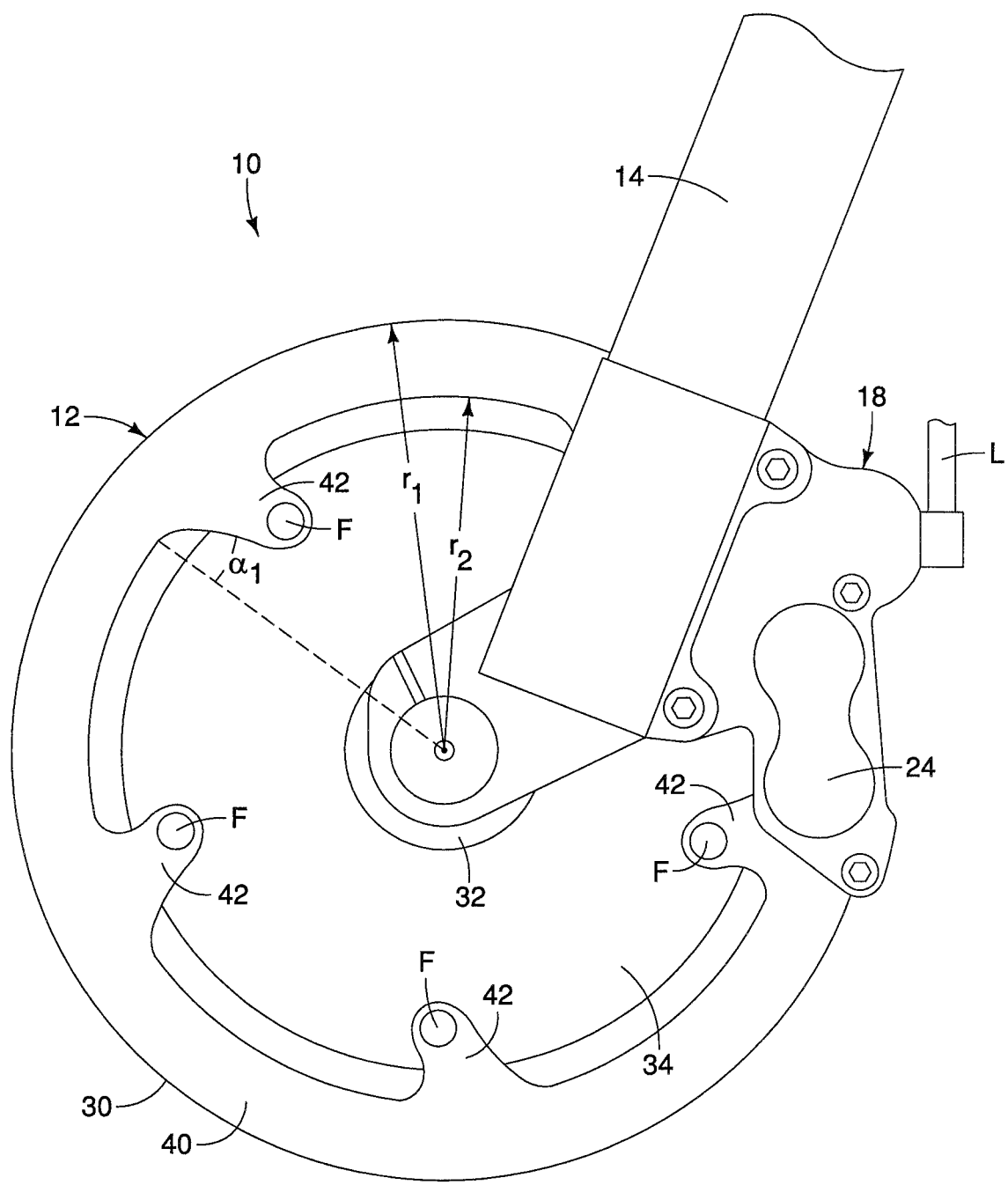
FIG. 2 is an enlarged side elevational view of a portion of the bicycle, showing a first side of the brake rotor assembly and a brake caliper in accordance with the first embodiment.

As shown in FIGS. 1 and 2, the brake system 18 includes a conventional brake actuating mechanism 22 (FIG. 1 only), a brake caliper 24 and the brake rotor assembly 12. The brake actuating mechanism 22 connected to the brake caliper 24 by a hydraulic line L such that in response to operation of the brake actuating mechanism 22, hydraulic fluid pressure generated by the brake actuating mechanism 22 is transmitted through the hydraulic line L to the brake caliper 24 in a conventional manner.

Figure 3:
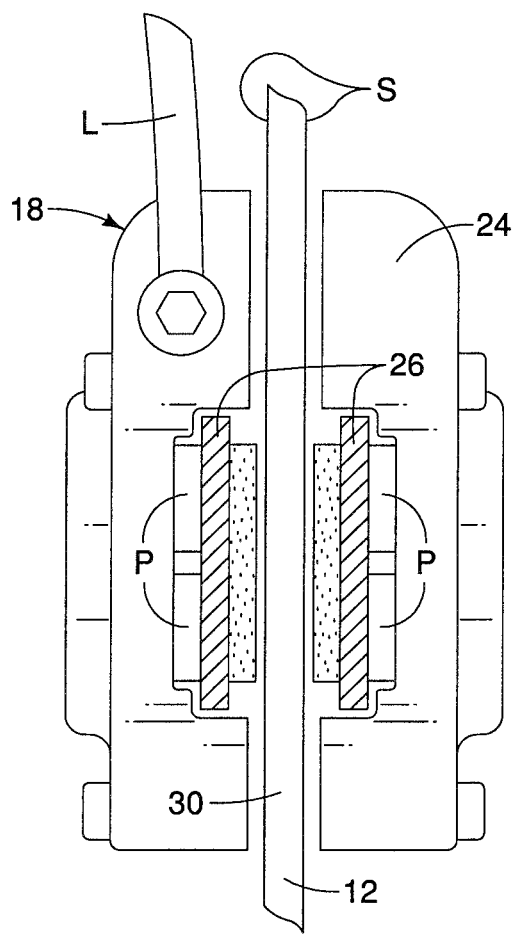
FIG. 3 is a schematic end view of the brake caliper showing hydraulic pistons of the caliper along with two brake pads, one pad on either side of the brake rotor assembly, with the brake pads spaced apart from the rotor such that the rotor and a front wheel of the bicycle can rotate in accordance with the first embodiment.
Figure 4:
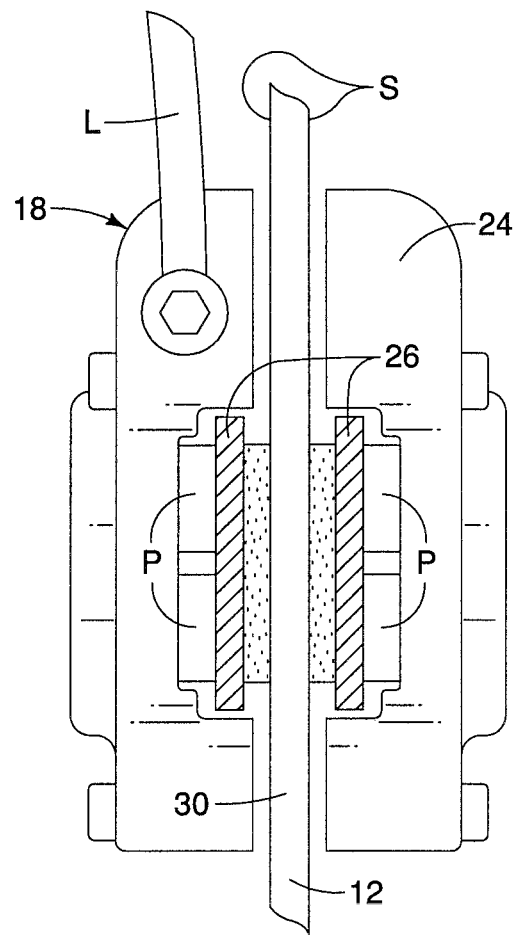
FIG. 4 is another schematic end view of the brake caliper similar to FIG. 3, showing the hydraulic pistons of the caliper urging the two brake pads into contact with the brake rotor assembly such that a braking force is applied by friction surfaces of the brake pads to corresponding surfaces of the brake rotor assembly to slow and subsequently stop rotation of the front wheel in accordance with the first embodiment.

The transmitted hydraulic pressure causes a piston or pistons P of the brake caliper 24 to move brake pads 26 into contact with braking surfaces S of the brake rotor assembly 12, as indicated in FIGS. 3 and 4. It should be understood from the drawings and the description herein that the brake caliper 24 can include a single piston or can have a pair of pistons P, as depicted in FIGS. 3 and 4.

When the brake pads 26 are urged into contact with the braking surfaces S of the brake rotor assembly 12, braking force is generated to stop the front wheel 16 from rotating. As a result, heat is generated. As is described in greater detail below, the brake rotor assembly 12 is designed to dissipate generated heat.

Figure 5:
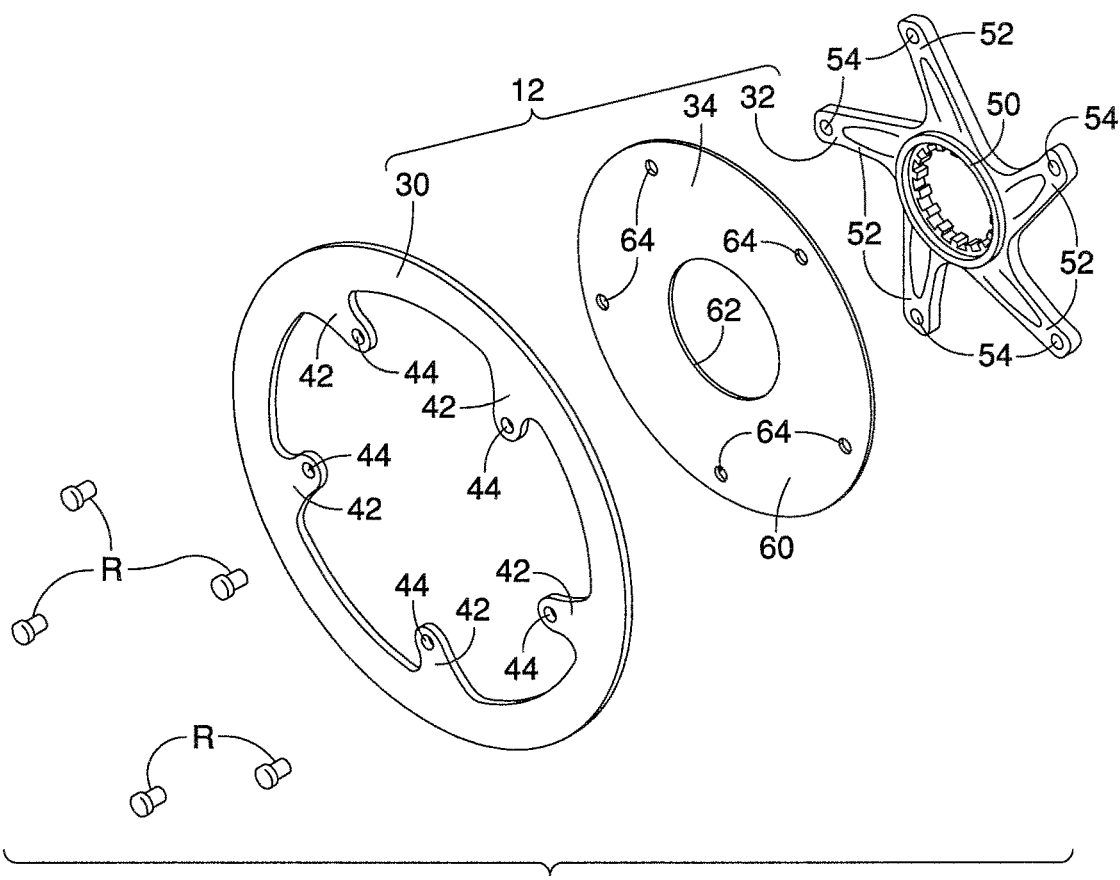
FIG. 5 is an exploded perspective view of the brake rotor assembly showing a rotor member, a cooling member and a hub attachment member, with the cooling member installed between the rotor member and the hub attachment member in accordance with the first embodiment.
Figure 6:
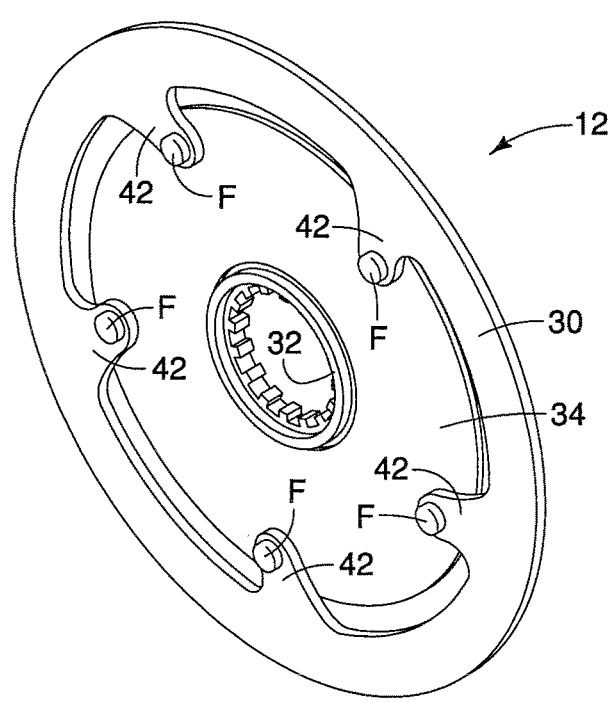
FIG. 6 is a perspective view of the brake rotor assembly shown fully assembled showing the cooling member being disposed between the rotor member and the hub attachment member in accordance with the first embodiment.

As best shown in FIGS. 5 and 6, the brake rotor assembly 12 includes a rotor member 30, a hub attachment member 32 and a cooling member 34.

The rotor member 30 includes an annular portion 40 and a plurality of projections 42 (an attachment portion) that extend radially inward from the annular portion 40. The rotor member 30 can be made of a metallic material, metal alloy or other material with good heat transmitting characteristics similar to metal materials. The braking surfaces S are defined on opposite sides of the annular portion 40 of the rotor member 30. Each of the projections 42 includes an aperture 44. The apertures 44 are dimensioned to receive a fastener F, as described in greater detail below. The braking surfaces S are preferably annular surfaces defined on opposite sides of the rotor member 30. The braking surfaces S also constitute a portion of first and second exterior surfaces of the rotor member 30. More specifically, first and exterior surfaces of the rotor member 30 include opposite ones of the braking surfaces S and corresponding surfaces of the projections 42.

The rotor member 30 is depicted with five projections 42 and five apertures 44. The five projections 42 define an attachment portion of the rotor member 30 that attach to the hub attachment member 32, as described below. However, it should be understood from the drawings and the description herein that the rotor member 30 can be provided with any number of projections and apertures. For example, the rotor member 30 can alternatively include three, four or six projections. As described in greater detail below, the projections 42 (the attachment portion) are provided for attachment to the hub attachment member 32 and the cooling member 34, and for conduction of heat to the cooling member 34.

Figure 7:
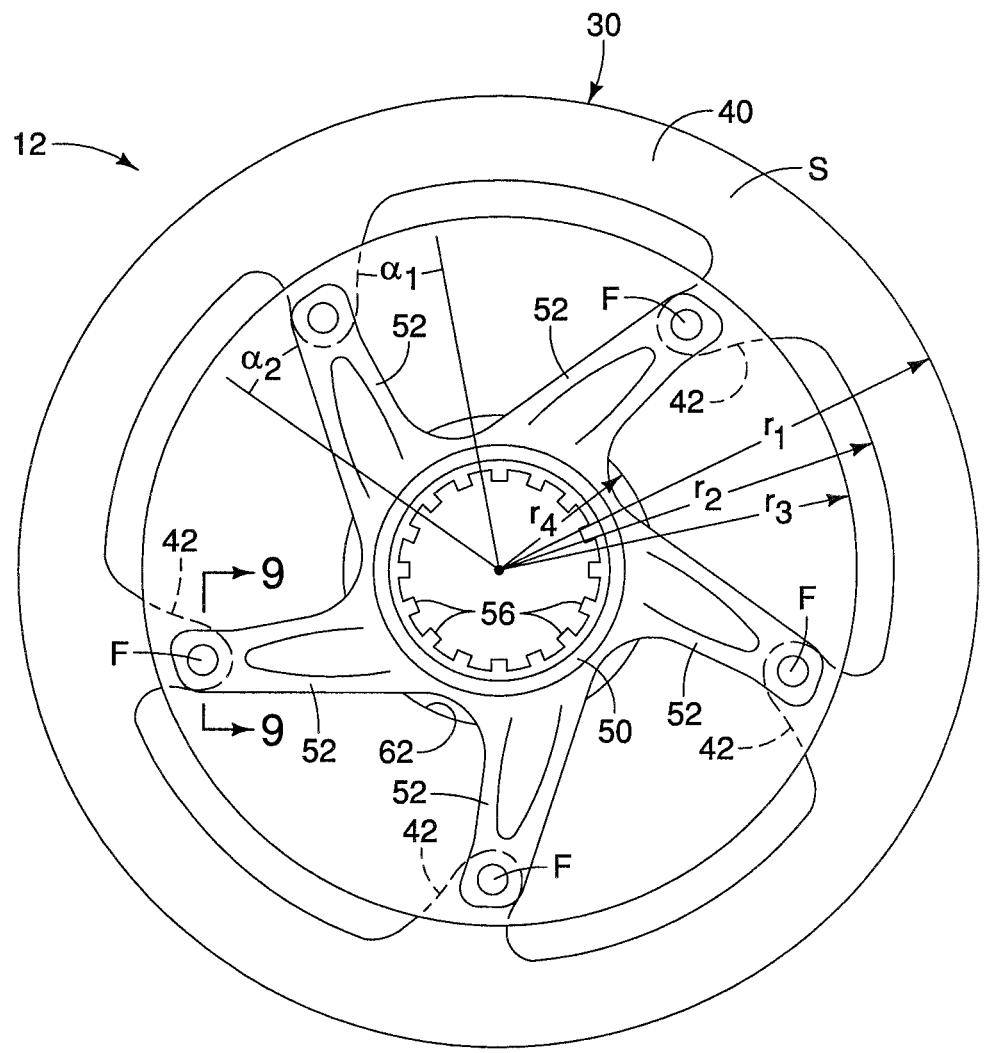
FIG. 7 is a side view of the brake rotor assembly shown removed from the bicycle, showing a second side of the brake rotor assembly (FIG. 2 shows the first side) in accordance with the first embodiment.

As indicated in FIGS. 2 and 7, the projections 42 are angularly offset by an angle $\alpha_1$ relative to a line extending outward from an axis A of rotation of the wheel 16 and the brake rotor assembly 12. The projections 42 are provided with the angular offset of the angle $\alpha_1$ for better strength for handling the torque experienced by the rotor member 30 during the braking process. The rotor member 30 also has an outer circumferential edge with radius $r_1$ and an inner circumferential edge with radius $r_2$.

The hub attachment member 32 includes a central hub section 50 and a plurality of radially outwardly extending projections 52, each projection 52 having a corresponding aperture 54. The central hub section 50 includes a plurality of wheel attachment gear teeth 56 dimensioned to engage a mating portion of the front wheel 16. The plurality of projections 52 define a connecting portion of the hub attachment member 32 that connects to the rotor member 30.

The hub attachment member 32 is depicted with five projections 52 and five apertures 54. The five projections 52 define the connecting portion of the hub attachment member 32. However, it should be understood from the drawings and the description herein that the hub attachment member 32 can be provided with any number of projections and apertures that mate with the projections 42 and apertures 44 of the rotor member 30. For example, the hub attachment member 32 can alternatively include three, four or six projections 52. In other words, the connecting portion of the hub attachment member 32 includes at least one a radially extending arm or projection 52 that is connected to the rotor member 30, as described below.

As indicated in FIGS. 2 and 7, the projections 52 are angularly offset by an angle $\alpha_2$ relative to a line extending outward from an axis A of rotation of the wheel 16 and the brake rotor assembly 12. The projections 52 are provided with the angular offset of the angle $\alpha_2$ for better strength for handling the torque experienced by the rotor member 30 during the braking process.

Figure 8:
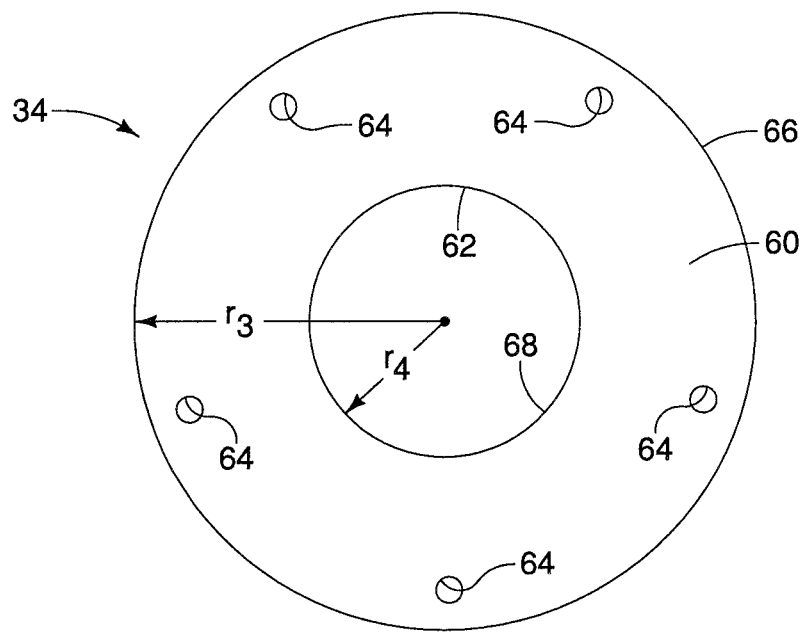
FIG. 8 is a side view of the cooling member shown removed from the brake rotor assembly in accordance with the first embodiment.
Figure 9:
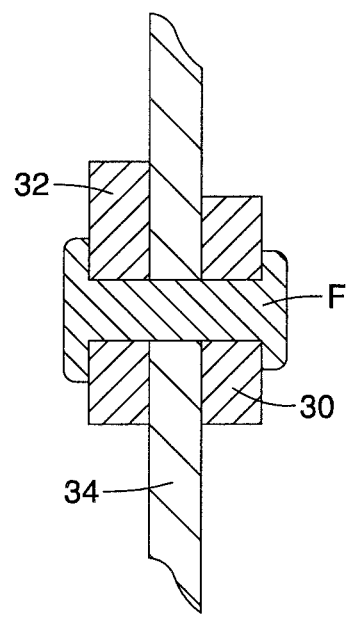
FIG. 9 is a cross-sectional view of a portion of the brake rotor assembly taken along the line 9-9 in FIG. 7, showing a rivet that rigidly fixes the rotor member, the cooling member and the hub attachment member together in accordance with the first embodiment.

As best shown in FIGS. 5 and 8, the cooling member 34 is basically an annular shaped disk that includes a disk portion 60 having a central aperture 62 and apertures 64. As best shown in FIGS. 7 and 8, the disk portion 60 has an outer circumferential edge 66 with a radius $r_3$ and an inner circumferential edge 68 with radius $r_4$. The cooling member 34 can be made of a metal material, such as an aluminium material, aluminium allow, or a carbon material with good heat transmitting characteristics.

In the embodiment depicted in FIGS. 2 and 5 thru 9, the rotor member 30, the hub attachment member 32 and the cooling member 34 are detachably fixed to one another by fasteners F. The fasteners F can be, for example, rivets or easily removable threaded bolts. In the depicted embodiment, the fasteners F are shown as rivets. Further, the fasteners F extend through the apertures 44 in the projections 42 of the rotor 30, through the apertures 64 of the cooling disk 34 and through the apertures 54 of the projections 52 of the hub attachment member 32. Hence, the cooling member 34 is detachably attached to the projections 42 (the attachment portion) of the rotor member 30 by the fasteners F. Further, the cooling member 34 is attached to one of the exterior surfaces of the rotor member 30.

In the embodiment depicted in FIGS. 2 and 5 thru 9, the cooling member 34 is sandwiched between the rotor member 30 and the hub attachment member 32. However, in a second embodiment depicted in FIG. 10, the rotor member 30 is sandwiched between the cooling member 34 and the hub attachment member 32. In a third embodiment, the hub attachment member 32 is sandwiched between the cooling member 34 and the rotor member 30.

As indicated in FIG. 7, the radius $r_1$ and the radius $r_2$ serve to define a surface area of the braking surface S of the rotor member 30. Specifically, the surface area of one of the braking surfaces S is equal to $\pi(r_1)^2$ minus $\pi(r_2)^2$. Further, the surface area of one side of the cooling member 34 is equal $\pi(r_3)^2$ minus $\pi(r_4)^2$.

The various radius' $r_1$, $r_2$, $r_3$ and $r_4$ are dimensioned such that the surface area of the cooling member 34 is greater than the surface area of braking surface S of the rotor member 30. Further, the inner radius $r_2$, of the rotor member 30 is larger than the outer radius $r_3$ of the cooling member 34. Hence, the cooling member 34 is spaced apart from the braking surfaces S and the annular portion 40 of the rotor member 30.

The brake rotor assembly 12 is designed to dissipate heat in a more efficient manner than in prior art rotor assemblies. Specifically, heat is generated when the brake pads 26 press against the braking surfaces S of the rotor member 30. The heat is conducted through the projections 42 and the fasteners F to the cooling member 34 and to the hub attachment member 32. Since the cooling member 34 has a greater surface area than the surface area of the braking surfaces S, heat is dissipated via confection (and radiation) from the cooling member 34 to the surrounding air.

Cooling the rotor member 30 by transmitting the heat to the cooling member 34 may help prolong the usable life of the rotor member 30 and may improve braking efficiency.

It should be understood from the drawings and description herein that the brake rotor assembly 12 can be used on the front wheel 16 or a rear wheel (not shown). Further, the brake rotor assembly 12 can be used with the hydraulic brake system 18 or with a mechanical brake system with non-hydraulic callipers or electric callipers.

Second Embodiment

Figure 10:
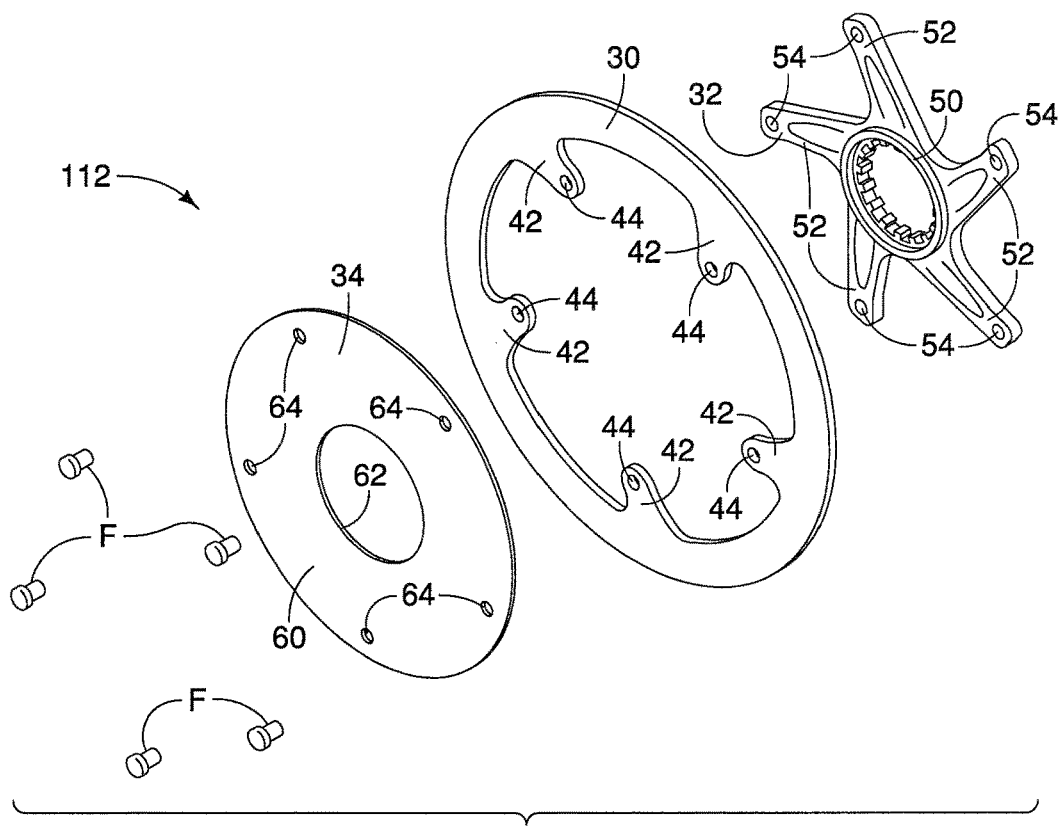
FIG. 10 is an exploded perspective view of a brake rotor assembly showing the cooling member, the rotor member and the hub attachment member with the cooling member installed to a side of the rotor member opposite from the hub attachment member in accordance with a second embodiment.

Referring now to FIG. 10, a brake rotor assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the brake rotor assembly 112 includes the rotor member 30, the cooling member 34 and the hub attachment member 32 of the brake rotor assembly 112 of the first embodiment. However, in the second embodiment, the rotor member 30 is sandwiched between the cooling member 34 and the hub attachment member 32. Further, the fasteners F extend through the apertures 64, the apertures 44 and the apertures 54 of the cooling member 34, the rotor member 30 and the hub attachment member 32, respectively, rigidly fixing the cooling member 34, the rotor member 30 and the hub attachment member 32 together.

Third Embodiment

Figure 11:
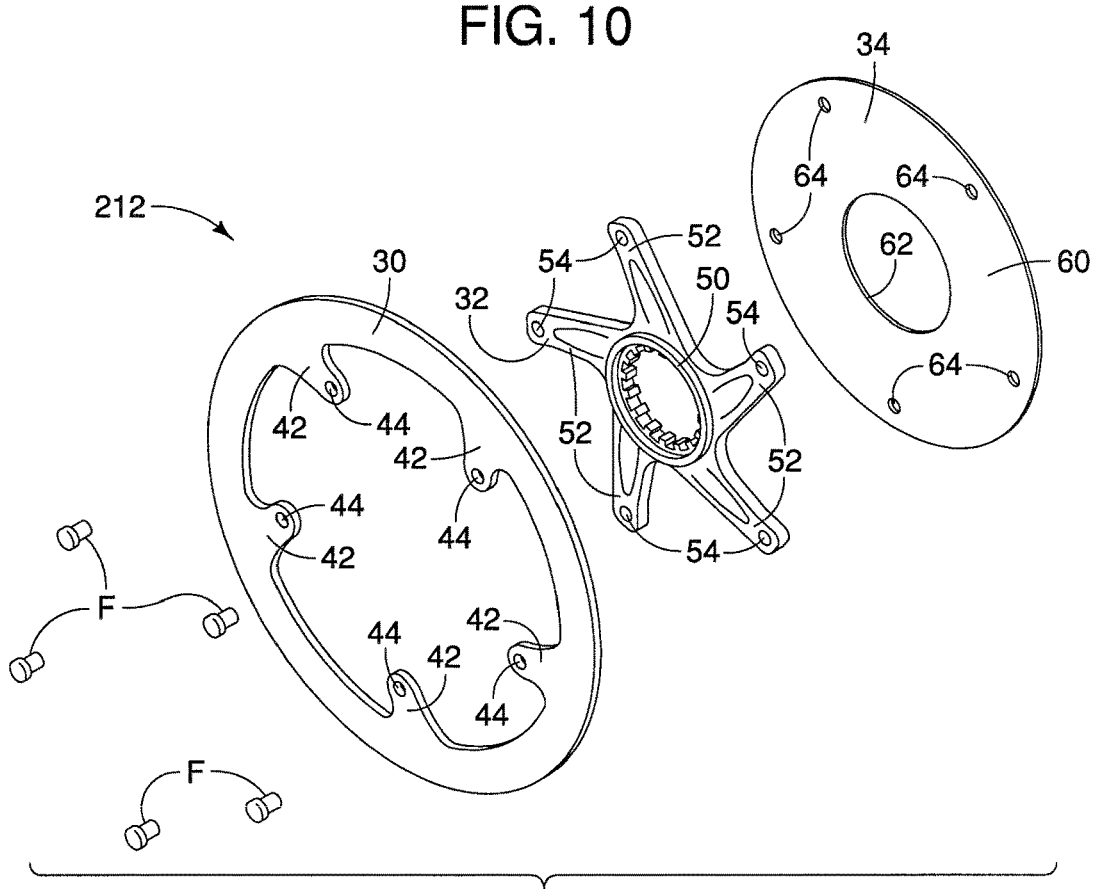
FIG. 11 is another exploded perspective view of a brake rotor assembly showing the rotor member, the hub attachment member and the cooling member with the cooling member installed to a side of the hub attachment member opposite from the rotor member in accordance with a third embodiment.

Referring now to FIG. 11, a brake rotor assembly 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the brake rotor assembly 212 includes the rotor member 30, the cooling member 34 and the hub attachment member 32 of the brake rotor assembly 112 of the first embodiment. However, in the third embodiment, the hub attachment member 32 is sandwiched between the rotor member 30 and the cooling member 34. Further, the fasteners F extend through the apertures 44, the apertures 54 and the apertures 64 of the rotor member 30 the hub attachment member 32 and the cooling member 34, respectively, rigidly fixing the cooling member 34, the rotor member 30 and the hub attachment member 32 together.

Fourth Embodiment

Figure 12:
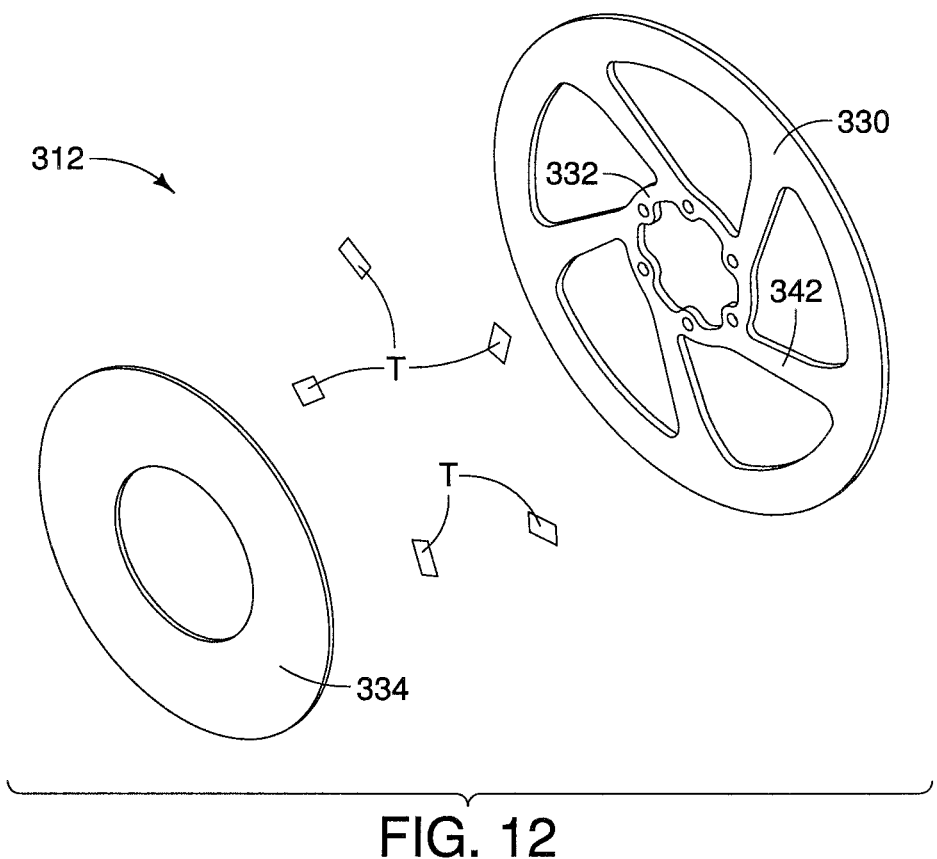
FIG. 12 is an exploded perspective view of a brake rotor assembly showing a rotor member that includes a hub attachment portion, with a cooling member attachable to the rotor member in accordance with a fourth embodiment.
Figure 13:
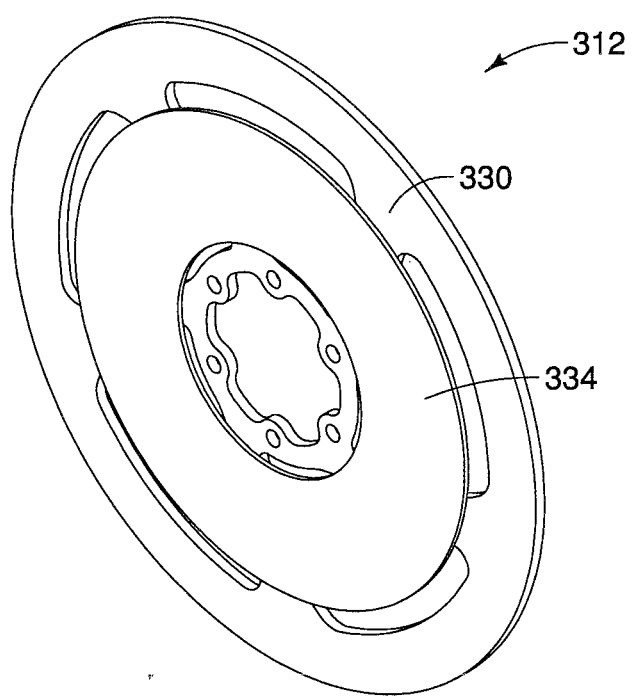
FIG. 13 is a perspective view of the brake rotor assembly shown fully assembled with the cooling member being disposed on the hub attachment member in accordance with the fourth embodiment.

Referring now to FIGS. 12 and 13, a brake rotor assembly 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The brake rotor assembly 312 includes a rotor member 330 and a cooling member 334. The rotor member 330 includes an outer annular rotor portion with braking surfaces, a plurality of radially inwardly extending projections 342, and a hub attachment portion 332. The outer annular rotor portion, the plurality of radially inwardly extending projections 342 and the hub attachment portion 332 are all formed as a single unitary, monolithic element (a one-piece member) with no seams or joints therebetween.

The hub attachment portion 332 includes a plurality of apertures (six apertures) provided for releasable attachment to the front wheel 16 (or a rear wheel—not shown) for use in a braking system, such as the braking system 18.

In the fourth embodiment, the cooling member 334 is the same as the cooling member 34 of the first embodiment, but has no need for apertures. Rather, the cooling member 334 is attached to the projections 342 and/or the hub attachment portion 332 of the rotor member 334 by a heat conductive adhesive material or double side tape T. The double sided tape T can be made of any of a variety of materials that have good heat conducting characteristics, such as a double sided adhesive metallic tape.

As shown in FIG. 12, the projections 342 define a plurality of gaps or openings therebetween. As shown in the fifth embodiment (below), these gaps or openings can be eliminated.

Fifth Embodiment

Figure 14:
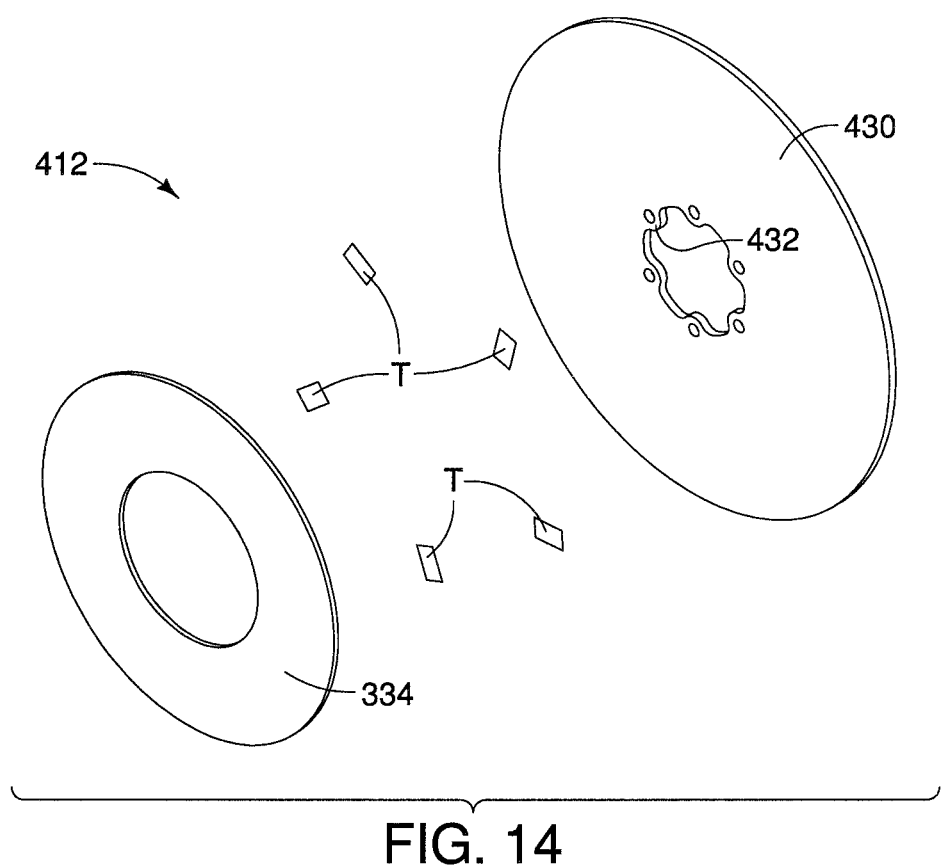
FIG. 14 is an exploded perspective view of a brake rotor assembly showing a rotor member that includes a hub attachment portion, with a cooling member attachable to the rotor member in accordance with a fifth embodiment.

Referring now to FIG. 14, a brake rotor assembly 412 in accordance with a fifth embodiment will now be explained. In view of the similarity between the first, fourth and fifth embodiments, the parts of the fifth embodiment that are identical to the parts of the first and fourth embodiment will be given the same reference numerals as the parts of the first embodiment. Moreover, the descriptions of the parts of the fifth embodiment that are identical to the parts of the first and fourth embodiments may be omitted for the sake of brevity.

The brake rotor assembly 412 includes a rotor member 430 and the cooling member 334. The rotor member 430 includes an outer rotor portion with braking surfaces and a hub attachment portion 432. The outer rotor portion and the hub attachment portion 432 are formed as a single unitary, monolithic element (a one-piece member) with no seams or joints therebetween.

The rotor member 430 does not include projections, but rather is solid between the outer rotor portion and the hub attachment portion 432.

In the fifth embodiment, the cooling member 334 is the same as that of the fourth embodiment. As with the fourth embodiment, the cooling member 334 is attached to rotor member 430 at any location between the braking surface section of the rotor member 430 and the hub attachment portion 432 of the rotor member 434 by a heat conductive adhesive material or double side tape T. The double sided tape T can be made of any of a variety of materials that have good heat conducting characteristics, such as a double sided adhesive metallic tape.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the brake rotor assembly. Accordingly, these terms, as utilized to describe the brake rotor assembly should be interpreted relative to a bicycle equipped with the brake rotor assembly as used in the normal riding position. Finally, terms of degree such as "substantially", "about" and "approximately" as used herein mean a reasonable amount of deviation of the modified term such that the end result is not significantly changed.

The terms "coupled", "coupled to" or "coupling", as used herein, encompass configurations in which a first element is directly secured to a second element by affixing the first element directly to the second element; configurations in which the first element is indirectly secured to the second element by affixing the first element to intermediate member(s) which in turn are affixed to the second element; and configurations in which the element is integral with the second element, i.e. one element is essentially part of the other element.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A brake rotor assembly comprising:
a rotor member having an annular portion and a braking surface on the annular portion such that a brake pad is urged into contact with the braking surface;
a cooling member coupled to the rotor member, the cooling member being formed of a material selected from the group consisting of a metal material, a metal alloy and a carbon material; and
a hub attachment member including at least at least one radially extending arm,
a distance from a rotational axis of the brake rotor assembly to a radially innermost portion of the braking surface of the rotor member being greater than a distance from the rotational axis of the brake rotor assembly to a radially outermost portion of the cooling member such that the cooling member is spaced apart from the braking surface of the rotor member in a radial direction,
the cooling member being coupled to a radially innermost portion of the annular portion of the rotor member via the at least one radially extending arm, and
a surface area of the cooling member being greater than a surface area of the braking surface of the rotor member.

2. The brake rotor assembly according to claim 1, wherein the cooling member is detachably coupled to the rotor member.

3. The brake rotor assembly according to claim 1, wherein the cooling member is coupled to an attachment portion of the rotor member.

4. The brake rotor assembly according to claim 3, wherein the cooling member is detachably coupled to the attachment portion of the rotor member by at least one fastening element.

5. The brake rotor assembly according to claim 3, wherein the cooling member is coupled to the attachment portion of the rotor member by at least one fastening element, the at least one fastening element being a rivet.

6. The brake rotor assembly according to claim 3, wherein the cooling member is coupled to the attachment portion of the rotor member by at least one fastening element, the at least one fastening element being double sided tape.

7. The brake rotor assembly according to claim 1, wherein the cooling member is a disk shaped member.

8. The brake rotor assembly according to claim 1, wherein the cooling member is directly attached to the rotor member.

9. The brake rotor assembly according to claim 1, wherein the hub attachment member has a hub attachment portion dimensioned to releasably attach to a bicycle hub and a connection portion coupled to an attachment portion of the rotor member by at least one fastening element.

10. The brake rotor assembly according to claim 9, wherein the cooling member is attached to the attachment portion of the rotor member and spaced apart from the rotor member.

11. The brake rotor assembly according to claim 9, wherein the cooling member is detachably attached to the connection portion by the at least one fastening element.

12. The brake rotor assembly according to claim 9, wherein the cooling member is detachably attached to the connection portion by the at least one fastening element, the at least one fastening element being a rivet.

13. The brake rotor assembly according to claim 9, wherein the connection portion of the hub attachment member comprises the at least one radially extending arm connected to the rotor member.

14. The brake rotor assembly according to claim 9, wherein the hub attachment member has a central hub section.

15. A brake rotor assembly comprising:
a rotor member having an annular portion, a first braking surface, a second braking surface, and a plurality of attachment portions that extend radially from the annular portion, the first braking surface and the second braking surface disposed on opposite sides of the annular portion; and a cooling member formed of a material selected from the group consisting of a metal material, a metal alloy and a carbon material, the cooling member being coupled to the plurality of attachment portions at a plurality of fasteners, a distance from a rotational axis of the brake rotor assembly to a radially innermost portion of the annular portion of the rotor member being greater than a distance from the rotational axis of the brake rotor assembly to a radially outermost portion of the cooling member such that the cooling member is spaced apart from the annular portion of the rotor member in a radial direction, and the cooling member including cooling portions between the plurality of fasteners that extend radially outwardly of the fasteners such that a distance from the rotational axis of the brake rotor assembly to a radially outermost portion of each of the cooling portions is greater than a distance from the rotational axis of the brake rotor assembly to each of the plurality of fasteners.

16. The brake rotor assembly according to claim 15, wherein the rotor member comprises a hub attachment portion, and the annular portion, the plurality of attachment portions and the hub attachment portion are formed as a single piece.

17. The brake rotor assembly according to claim 1, wherein the cooling member is coupled to the radially innermost portion of the annular portion of the rotor member at least one fastener via the at least one radially extending arm.

* * * * *